March 16, 1937.  S. M. GRAY  2,073,691
APPARATUS FOR DETECTION OF STRAIN IN DIFFUSIVE GLASS
Filed Aug. 15, 1935
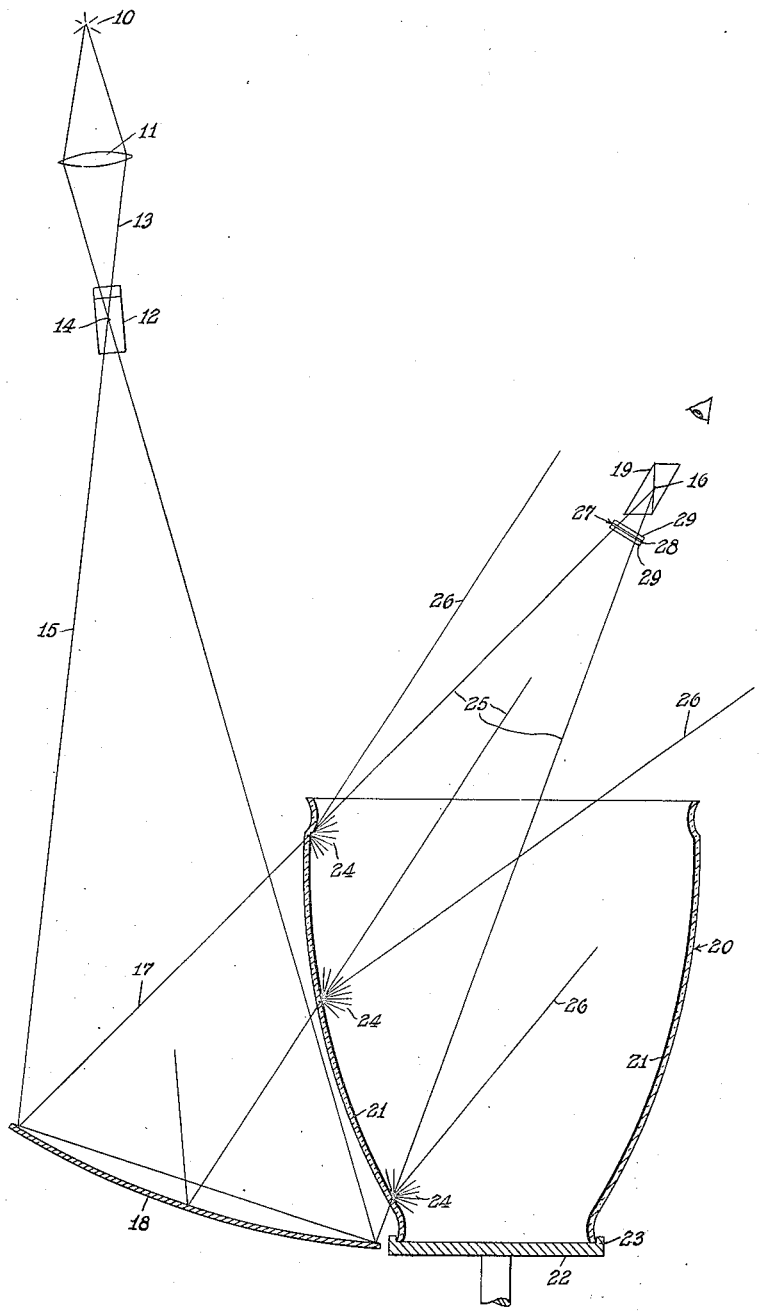
INVENTOR.
BY Samuel M. Gray
Williams, Rich & Morse
ATTORNEYS

UNITED STATES PATENT OFFICE 2,073,691

APPARATUS FOR DETECTION OF STRAIN IN DIFFUSIVE GLASS

Samuel M. Gray, Yonkers, N. Y., assignor to Electrical Testing Laboratories, New York, N. Y., a corporation of New York Application August 15, 1935, Serial No. 36,256

2 Claims. (Cl. 88—14)

The present invention relates in general to the detection of strain in glass by the use of apparatus employing the action of polarized light as a means for analyzing such strain and commonly referred to as polariscopes in the glass industry. More specifically stated, the present invention relates to the detection of strain in glass of a partially diffusing character, such glass for example including frosted glass (clear glass having an irregular surface produced by acid etching or sand blasting), lightly flashed opal glass (clear glass having on one of its surfaces a flashing of alabaster or opal glass), as well as other opalescent glasses, such as clear glass having a relatively small amount of crystalline or globular inclusions disseminated throughout its mass. By the invention strain may be detected in any glass of the type acting to partially diffuse light transmitted therethrough, such diffusion being for example produced by a surface or thin film or coating of a translucent or light-diffusing character on the glass or by a relatively small amount of inclusions in the glass.

In my copending application Serial No. 606,851, filed April 22, 1932, an apparatus is described enabling strain in glass of the type mentioned to be detected by visual examination of the specimen therein. As essential elements this apparatus comprises a light source of high intensity and optical means for directing rays from said source without diffusion to the polarizer, so that the rays from the polarizer are caused to take the form of a powerful beam of polarized light. In the usual manner, the polarizer and analyzer have their respective planes of polarization to light at right angles to one another in order to darken the field of light as seen by the observer, the specimen to undergo examination being positioned in the path of the non-diffused rays from the polarizer and on the line of vision through the analyzer. Diffusion of the rays from the polarizer necessarily takes place as a result of their passage through the specimen, but, as stated, if the source is of sufficiently high intensity, a substantial quantity of said rays passes through the specimen without appreciable diffusion. That is, light in substantial amount nevertheless reaches the analyzer substantially undeflected by the specimen and therefore substantially undepolarized, because of which strain in the specimen is made visible to the observer. Moreover, because of the very light-diffusing nature of the specimen, it acts to even up the illumination of the field in which the strain appears. That is, a background of uniform dimness is created rendering both location and magnitude of the strain distinctly observable therein.

The above apparatus is limited to the testing of comparatively small specimens, such as frosted electric lamp bulbs, and I have found this to be due to the light which is actually depolarized by diffusion when travelling through the specimen. That is, a certain amount of the light depolarized in this manner finds its way to the analyzer and the larger the specimen undergoing examination the greater is the amount of this light transmitted to the analyzer. A limit is thus reached in specimen size where depolarized light has a prevalent action on the visual field and satisfactory detection of strain therein is rendered impossible.

An object of the invention is to enable glass of a partially diffusing character to be more effectively visually examined for strain than has heretofore been possible, by minimizing as much as possible the depolarized light incident to the analyzer.

Another object of the invention is to enable visual detection of strain in comparatively large specimens of such glass.

A further object of the invention is to enable visual detection of strain in hollow bodies of such glass, which have a side wall terminating in an open end.

A still further object of the invention is to enable visual detection of strain in hollow bodies of such glass, which have a flaring wall terminating in an open end of enlarged cross-section.

Still another object of the invention is to provide apparatus for carrying out the above objects, which is both simple in construction and reliable in operation.

The invention may be considered as an improvement over my former apparatus as disclosed in the aforesaid copending application. The same high-intensity source is utilized, and the rays from such source again travel to the polarizer and thence through the specimen without diffusion other than that caused by the specimen, but here the rays are so directed as to cause them to normally converge substantially to a point at the analyzer. That is, with the specimen removed from the polariscope, all light from the polarizer proceeds substantially to a point located at least in close proximity to the analyzer, but preferably within the analyzer when of the type adapted to transmit light therethrough, such as a Nicol prism. Consequently, with the specimen positioned for test in the path of light between the polarizer and analyzer, the visual field is essentially composed of those rays which travel to the analyzer substantially undeflected and therefore substantially underpolarized by the specimen. That is, very little of the light which is appreciably deflected and therefore appreciably depolarized by the specimen is capable of reaching the analyzer, regardless of the specimen size, and it is even possible, by employing an analyzer of the type above referred to and of minimum dimensions, to exclude substantially all of the depolarized light from the visual field.

The invention will be clearly understood with the aid of the following description taken in connection with the accompanying drawing, in which an embodiment thereof is illustrated in simplified manner.

Referring now to the drawing, a powerful source of light 10, such as a 400 watt projection lamp, is placed on the principal axis of an optical system 11, shown for convenience as a simple lens, the rays from said source being thus caused to be directed to the polarizer 12 in the form of a non-diffused beam of light 13. The polarizer 12 is shown as comprising a Nicol prism and therefore functions to pass light incident thereto, the optical system 11 being so constructed and positioned with reference to the source 10 as to cause the beam 13 to converge upon the prism 12, with the point of convergence 14 preferably located at its geometrical center. The polarized rays first proceed from the polarizer 12 in the form of a divergent beam of light 15, but are nevertheless caused to all normally proceed substantially to a point 16 by redirecting them in the form of a convergent beam 17 through the medium of a concave spherical mirror 18 suitably positioned in their path, the mirror 18 being preferably made of metal so as to substantially eliminate all effect of depolarization by reflection. The analyzer 19 is also shown as comprising a Nicol prism, which is therefore preferably so positioned as to cause the point 16 to substantially coincide with its geometrical center, the focal length of the mirror 18 being so chosen that the beam 17 is caused to have the small angle of convergence required for proper use of the prism 19. As to the aperture of the mirror 18, it is governed by the size of the specimen to undergo test in the path of the polarized beam 17. An electric lamp globe 20 is shown positioned in such path, and the mirror 18 should therefore have an aperture sufficient to enable a large portion of such specimen to be visually examined by passage of the beam 17 therethrough. By downwardly directing the rays through the polarizer 12 and slightly tilting the mirror 18, so that the reflected beam 17 is caused to be both upwardly directed and inclined, specimen examination through the analyzer 19 is made most convenient.

The globe 20 has a flaring wall terminating in an open end of reduced diameter and in an open end of enlarged diameter. As shown, it is preferably disposed for test with its wall flaring upwards so as to position its larger end uppermost and therefore utilize the polarized beam 17 to greatest advantage. A turntable 22 is provided for thus supporting the globe 20, which is held against displacement thereon by a circular flange 23. The beam 17 impinges on only a portion of the globe 20, but by taking hold of the globe 20 the observer may turn it at will into various positions and thus readily examine it over its entire extent.

As shown, the inner surface of the globe 20 has formed thereon a light-diffusing film 21, such as a flashing of opal glass. By their passage through this film, the rays comprising the beam 17 each give rise to a multiplicity of rays proceeding in various directions, as indicated by the bundles 24. Because of the high intensity source 10, however, a substantial quantity of the rays included in the beam 17 pass through the light-diffusing film 21 substantially without deviation or diffusion, as indicated by the rays 25, and it is to be particularly noted that there are substantially no rays redirected along with the rays 25 after having suffered considerable deviation or diffusion during actual travel through the light-diffusing film 21. That is, practically all of the light proceeding in the directions of the rays 25 is composed of rays which have been substantially directly transmitted through the light-diffusing film 21, and is therefore substantially undepolarized light transmitted to the analyzer 19. As to the light which proceeds in directions appreciably different from those of the rays 25, substantially none of it is capable of reaching the analyzer 19 in the embodiment illustrated, as clearly shown by the rays 26 included in the bundles 24. Observing that depolarization decreases rapidly with decreasing deflection of the rays in general, it is thus apparent that the visual field is essentially composed of substantially undepolarized light reaching the analyzer 19. It is to be particularly noted that because of the convergence of the reflected beam 17 and the position of the globe 20 in its path, the undepolarized rays 25 are permitted to pass through an open end of such globe prior to reaching the analyzer 19.

By locating the point 16 at the geometrical center of the analyzer 19, the aperture adapting the analyzer 19 for proper examination of a given specimen is reduced to a minimum. In other words, for this location of the point 16 the required dimensions of the analyzer 19 are minimum, because of which maximum depolarized light may be excluded from the visual field. Moreover, the analyzer 19 may be constructed at minimum cost.

As shown in the drawing, the two prisms constituting the polarizer 12 and analyzer 19 are set in 90° relationship to one another. That is, their respective planes of polarization to light are at right angles to one another so that substantially no light can normally be transmitted through the analyzer 19 to the eye of the observer, as well known in the art. Now strained glass is birefringent, i. e., it acts as a double-refracting crystal under the influence of light. Should a strain be present in the globe 20, a change will thus be caused in the character of those rays 25 which pass through the strain. This change is generally believed to be a transformation into some form of elliptical polarization. Whatever may be the nature of the change, the altered light is nevertheless transmitted through the analyzer 19 so that the field is illuminated locally, the illuminated portion giving both the location of the strain and (by its degree of illumination) an estimate of the magnitude of the strain.

It should be here pointed out that this visual detection of strain in glass of a partially diffusing character is actually made possible by such glass. In the particular embodiment illustrated, the rays 25 composing the visual field are made uniform in intensity by the light-diffusing film 21. Without this film, an image of the source 10 would be formed at the point 16 and it would consequently be difficult to detect strain in any specimen.

I prefer to interpose a tint-producing element 27 in the path of the rays 25 to the analyzer 19, as it usually assists in determining both the character and the orientation of the strain. As well known in the art, such element may consist of a thin sheet of crystal 28, such as selenite, held between two plates 29 of unstrained optically plane transparent glass. When using selenite, the usual color of the field is a uniform purple, the strain appearing in vividly contrasting colors, such as red and blue.

It now becomes apparent that I have provided an apparatus for detecting strain in glass of a partially diffusing character satisfying the various objects of the invention, but it is desired to have it understood that the invention is not limited to the particular embodiment illustrated and described and that this embodiment is subject to various modifications without departing from the spirit of the invention. The opalescent globe 20 may be replaced by one having a minor amount of light-diffusing inclusions disseminated throughout the thickness of its wall, and it is possible to detect strain in globes having either an inside or an outside surface or film of a light-diffusing character.

What is claimed is:

1. An apparatus for visually detecting strain in hollow partially diffusing glass bodies having a side wall terminating in an open end, comprising a source of light, a polarizer and an analyzer set in 90° relationship to one another, optical means for directing rays from said source without diffusion to said polarizer and from said polarizer in the form of a downward divergent beam of light, a non-depolarizing reflector for redirecting the rays from said polarizer in the form of an upward inclined convergent beam of light normally proceeding without diffusion substantially to a point at said analyzer, and means for supporting the partially diffusing body to undergo study in the path of said upward beam of light with its side wall extending to position its open end uppermost, said source being of sufficiently high intensity to cause a substantial quantity of substantially undeflected rays to pass through said wall of said supported body, said supporting means being positioned to cause said substantially undeflected rays to pass through said open end of said supported body prior to reaching said analyzer.

2. An apparatus for visually detecting strain in hollow partially diffusing glass bodies having a flaring wall terminating in an open end of enlarged cross-section, comprising a source of light, a polarizer and an analyzer set in 90° relationship to one another, optical means for directing rays from said source without diffusion to said polarizer and from said polarizer in the form of a downward divergent beam of light, a non-depolarizing reflector for redirecting the rays from said polarizer in the form of an upward inclined convergent beam of light normally proceeding without diffusion substantially to a point at said analyzer, and a turntable for supporting the partially diffusing body to undergo study in the path of said upward beam of light with its wall flaring upwards to position its enlarged open end uppermost, said source being of sufficiently high intensity to cause a substantial quantity of substantially undeflected rays to pass through said wall of said supported body, said turntable being positioned to cause said substantially undeflected rays to pass through said enlarged open end of said supported body prior to reaching said analyzer.

SAMUEL M. GRAY.